US009592468B2

(12) United States Patent
Haroun et al.

(10) Patent No.: US 9,592,468 B2
(45) Date of Patent: Mar. 14, 2017

(54) PARTITIONED DISTRIBUTOR TRAY FOR OFFSHORE GAS/LIQUID CONTACT COLUMN

(71) Applicant: IFP Energies nouvelles, Rueil-Malmaison (FR)

(72) Inventors: Yacine Haroun, Grigny (FR); Ludovic Raynal, Oullins (FR); Pascal Alix, Roussillon (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 503 days.

(21) Appl. No.: 13/865,239

(22) Filed: Apr. 18, 2013

(65) Prior Publication Data

US 2013/0277868 A1    Oct. 24, 2013

(30) Foreign Application Priority Data

Apr. 18, 2012 (FR) .................... 12 01144

(51) Int. Cl.
*B01D 3/20* (2006.01)
*B01D 53/18* (2006.01)
*B01D 3/00* (2006.01)
*B63B 35/44* (2006.01)

(52) U.S. Cl.
CPC .......... *B01D 53/185* (2013.01); *B01D 3/008* (2013.01); *B63B 35/44* (2013.01); *Y10T 29/49* (2015.01)

(58) Field of Classification Search
CPC ...... B01D 3/008; B01D 53/185; B63B 35/44; Y10T 29/49
USPC .... 261/108, 113, 114.1, 114.2, 114.3, 114.4, 261/114.5
See application file for complete search history.

(56) References Cited

U.S. PATENT DOCUMENTS

| 1,738,870 A | * | 12/1929 | Cox | .......................... B01D 3/22 |
| | | | | 261/113 |
| 2,344,700 A | * | 3/1944 | Hutcheson | ............... B01D 3/18 |
| | | | | 261/114.1 |
| 2,545,691 A | * | 3/1951 | Gerhold | ................... B01D 3/18 |
| | | | | 261/114.1 |

(Continued)

FOREIGN PATENT DOCUMENTS

FR    2 771 018 A1    5/1999
FR    2 771 019 A1    5/1999

OTHER PUBLICATIONS

Hirt, C.W. and Nichols, B.D.: "Volume of Fluid (VOF) Method for the Dynamics of Free Boundaries," Journal of Computational Physics, vol. 39, pp. 201-225 (1981).

*Primary Examiner* — Charles Bushey
(74) *Attorney, Agent, or Firm* — Fitch, Even, Tabin & Flannery LLP (57) ABSTRACT

The invention is a distributor tray for a column (1) for heating and/or material exchange between a gas (G) and a liquid (L). At least one wall (6) defines compartments (8) on one of the surfaces of the tray. The walls are perforated (7) to allow part of the liquid to flow between compartments (8). Each compartment has a passage providing flow of the liquid through the tray and for a passage providing flow of the gas through the tray. The invention also relates to a gas/liquid contact column, a gas treatment unit, a $CO_2$ capture unit, a distillation unit, and an offshore floating barge including the distributor tray. The invention also relates to a method of manufacturing the tray.

22 Claims, 5 Drawing Sheets

(56) References Cited

U.S. PATENT DOCUMENTS

| | | | | |
|---|---|---|---|---|
| 2,713,478 A | * | 7/1955 | Ragatz | B01D 3/22 |
| | | | | 202/158 |
| 3,969,194 A | * | 7/1976 | Mende | B01D 3/14 |
| | | | | 159/15 |
| 4,311,564 A | * | 1/1982 | Aldridge | B01D 3/22 |
| | | | | 202/158 |
| 5,132,055 A | | 7/1992 | Alleaume et al. | |
| 5,752,538 A | | 5/1998 | Billingham et al. | |
| 6,149,136 A | | 11/2000 | Armstrong et al. | |
| 6,294,053 B1 | | 9/2001 | Darredeau | |
| 6,338,774 B1 | | 1/2002 | Lehman | |
| 6,395,138 B1 | | 5/2002 | Darredeau | |
| 6,631,892 B1 | * | 10/2003 | Erickson | B01F 3/04496 |
| | | | | 261/114.1 |
| 7,988,134 B2 | * | 8/2011 | Alzner | B01D 3/22 |
| | | | | 202/158 |
| 8,500,105 B2 | * | 8/2013 | Nieuwoudt | B01D 3/008 |
| | | | | 261/114.2 |
| 9,120,064 B2 | * | 9/2015 | Horoun | B01F 3/04496 |
| 2004/0020238 A1 | | 2/2004 | Kalbassi et al. | |
| 2006/0244159 A1 | * | 11/2006 | White | B01J 19/32 |
| | | | | 261/94 |
| 2007/0126134 A1 | * | 6/2007 | Xu | B01D 3/20 |
| | | | | 261/114.1 |
| 2010/0039881 A1 | * | 2/2010 | Nieuwoudt | B01D 3/18 |
| | | | | 366/107 |

* cited by examiner

(Prior Art)

Figure 3

(Prior Art)

PARTITIONED DISTRIBUTOR TRAY FOR OFFSHORE GAS/LIQUID CONTACT COLUMN

CROSS-REFERENCE TO RELATED APPLICATIONS

Reference is made to French Patent Application Serial No. 12/01.144, filed on Apr. 18, 2012, and copending related application entitled "DISTRIBUTOR TRAY FOR OFFSHORE GAS/LIQUID CONTACT COLUMN." filed on Apr. 17, 2013 which applications are incorporated herein by reference in their entirety.

BACKGROUND OF THE INVENTION

Field of the Invention

The present invention relates to offshore gas/liquid contact columns, and more particularly to offshore gas treatment, $CO_2$ capture, dehydration or distillation units.

Description of the Prior Art

Offshore gas treatment and/or $CO_2$ capture units using amine wash processes comprise liquid or gaseous fluid absorption and regeneration columns. These columns operate under counter-current or co-current gas/liquid flow conditions and they are, for example, installed on vessels, floating barges or offshore platforms, of FPSO (Floating Production, Storage and Offloading) type or of FLNG (Floating Liquefied Natural Gas). Floating barges also comprise distillation columns or dehydration columns.

Figure 1:
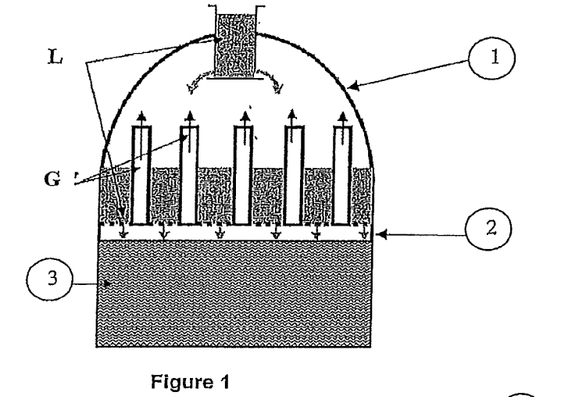
FIG. 1, already described, illustrates the particular case of a gas treatment or $CO_2$ capture column equipped with a distributor tray at the column top.

The columns used in these offshore gas treatment and/or $CO_2$ capture and/or distillation and/or dehydration units are generally based on the principle of a material and/or heat exchange between the gas and the fluid that circulate in the columns. FIG. 1 shows a particular case of a gas treatment column (1) equipped with a distributor tray at the column top. Conventionally, this gas treatment column (1) comprises several sections (3) filled by a contactor. A distributor tray (2) is arranged above each section (3). The gas/liquid contactor contacts gas (G) with liquid (L) to allow exchanges.

Figure 2:
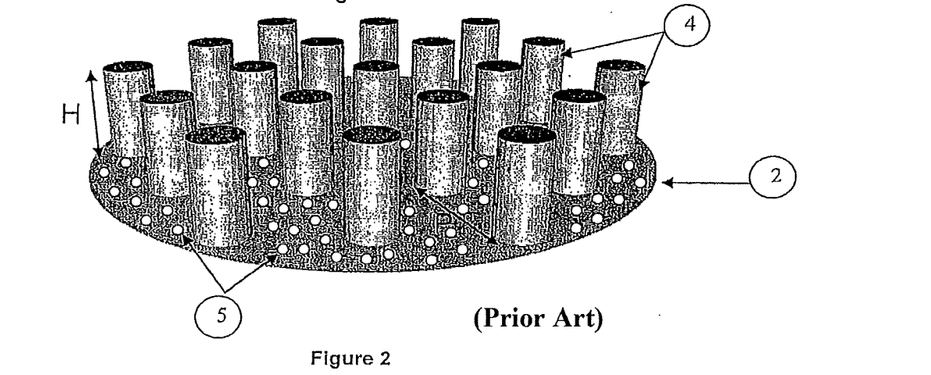
FIG. 2, already described, illustrates a distributor tray according to the prior art.

The standard distributors (2) used in absorption/regeneration or distillation columns generally include a collector/distributor tray equipped with chimneys (4) (see FIG. 2). Distribution of the liquid occurs through passage thereof in orifices (5) positioned in the lower part of tray (2) and distribution of the gas occurs through chimneys (4). Each chimney (4) allows passage of the gas, according to the counter-current or co-current operating mode, from the lower part of the column to the upper part of column (1), or from the upper part to the lower part. Chimneys (4) project beyond one side of tray (2) and they are perpendicular thereto. Each chimney (4) has several walls, which for example are parallelepipedic or cylindrical, which define an inner volume that is open on either side of tray (2). In order to prevent the liquid from passing through the chimneys (4), the gas outlet or inlet opening above the tray (according to the counter-current or co-current mode) is preferably orthogonal to the longitudinal direction of chimney (4). The purpose of the distributor tray is to distribute liquid (L) homogeneously onto gas/liquid contactor (3).

The trays equipped with chimneys can be of different types and positioned according to different configurations. Different distributor tray variants are described in the following U.S. Pat. Nos. 6,338,774 B, 6,149,136 and 5,752,538 and U.S. Published Application 2004/020238.

The gas/liquid contact columns are placed on floating structures, of vessels, platforms or barges which are sensitive to wave motion. The equipments installed on these units, notably gas/liquid distributor trays, undergo wave motions up to six degrees of freedom (yaw, pitch, roll, heave, sway, thrust).

By way of example, the angle associated with the combination of the pitch and roll oscillations is of the order of +/−5° with a period from 15 to 20 s. The orders of magnitude of the longitudinal, transverse and vertical accelerations encountered in the column range respectively between 0.2/0.7/0.2 m/s² 6 m above the deck where the column is arranged and 0.3/1.2/0.3 m/s² 50 m above the deck.

Under such conditions, the operation of conventional distributor trays equipped with chimneys (FIG. 2) can be greatly disturbed. Indeed, the operation of these distributors is mainly based on gravity, and a liquid guard level of homogeneous height "h" has to form on the distributor tray. The square of the velocity of flow of the liquid through orifices (5) in the lower part of tray (2) is proportional to the height of the liquid guard level ($U_L^2 \propto gh$). When tray (2) is inclined under the effect of the wave motion (FIG. 3), the height of the liquid level is no longer uniform on the distributor tray ($h_1 > h_2$), which causes an imbalance in the distribution of liquid at the inlet of gas/liquid contactor (3). The distribution quality and thus the efficiency of the column are greatly impacted. This poor distribution, if it is not controlled, can substantially degrade the performances of the column. A great liquid guard height (around 0.6 m) would be necessary to make up for these effects, which means bulk and weight increase, which is not suitable for offshore units.

In order to avoid this type of problem, distribution elements relatively insensitive to horizontal variability have been used. These distributors generally have a collector and a distributor connected by one or more relatively long vertical lines so that the distributor remains on charge whatever the wave motion conditions that are encountered. These distributors are generally insensitive to the effects of the wave motion and they generate a good distribution quality, but they are very bulky. They can be several meters high in some cases as described in U.S. Published Application 2004/020238.

Another solution to these problems is described in French Patents 2,771,018 and FR 2,771,019. They use two distributors (primary and secondary). Each distributor is divided into compartments in which the liquid spreads. These compartments allow the liquid to be better distributed in case of inclination of the column. However, this option remains cumbersome because it requires two distributors. Moreover, the compartments do not communicate with one another, so the liquid is not evenly distributed in the compartments.

SUMMARY OF THE INVENTION

The invention relates to a distributor tray comprising gas passage means and liquid passage means, as well as perforated partitioning means providing good distribution quality and good dispersion of the liquid, even in case of great tray inclinations imposed by the marine environment.

The invention relates to a distributor tray for a column intended for heat and/or material exchange between a gas (G) and a liquid (L), comprising at least one wall defining compartments on one of the surfaces of the tray. The wall is perforated to permit part of the liquid to flow between compartments (8). Each compartment comprises at least one means (5) allowing passage of the liquid through the tray (2) and at least one means (4) allowing passage of the gas through the tray.

According to the invention, the means permitting passage of the gas are chimneys projecting by a height H from one of the surfaces of the tray.

Advantageously, the height of the wall is substantially equal to height H of the chimneys.

Preferably, the perforations are arranged at the base of the walls.

Advantageously, the chimneys are cylindrical.

According to an embodiment, the tray comprises non-parallel walls.

According to an embodiment, the walls have two series of walls with the walls of each series being parallel to one another and non-parallel to the walls of the other series.

According to the invention, the perforations of the two parallel walls defining the same compartment are not aligned.

Advantageously, each wall portion defining a compartment comprises a single perforation.

According to the invention, a distance L1 between two consecutive parallel walls satisfies the relation as follows:

$$L1 \le \frac{50}{2\tan\theta}(mm)$$

with $\theta$ being a maximum inclination angle of the tray to the horizontal. Furthermore, a length L2 of a diagonal of a compartment satisfies the relation as follows:

$$L2 \le \frac{50}{2\tan\theta}(mm)$$

with $\theta$ being a maximum inclination angle of the tray to the horizontal. Lengths L1 and L2 range between 20 and 2000 mm.

In a variant, the liquid passage means are chimneys equipped with at least one perforation with the chimneys projecting from one of the surfaces of the tray.

Furthermore, the invention relates to an offshore fluid absorption or regeneration column wherein two fluids are contacted by means of a gas/liquid contactor. The column comprises at least a first inlet for a liquid fluid, at least a second inlet for a gaseous fluid, at least a first outlet for a gaseous fluid and at least a second outlet for a liquid fluid. The column comprises a distributor tray according to the invention allowing distribution of the fluids onto the contactor.

The invention furthermore relates to a gas treatment unit and/or $CO_2$ capture unit using gas washing with an absorbent solution, notably containing amines. The unit comprises at least one column as described above that permits exchanges between the gas and the absorbent solution.

The invention also relates to a distillation and/or gas dehydration unit with the unit comprising at least one column as described above that permits exchanges between the gas and a liquid.

The invention furthermore relates to an offshore floating barge, notably for hydrocarbon recovery, which comprises a gas treatment and/or $CO_2$ capture unit as defined above or a distillation and/or dehydration unit as defined above for cleaning the gases which are produced.

The invention also relates to a method of manufacturing a tray according to the invention, wherein the following stages are carried out:

a) defining an imbalance index IQ for the tray (2) wherein:

$$IQ(\%) = \frac{U_{L1} - U_{L2}}{(U_{L1} + U_{L2})/2}100$$

with $U_{L1}$ and being $U_{L2}$ the velocities of the liquid leaving the tray at two diametrically opposed ends of the tray;

b) selecting a maximum imbalance index for the tray (2) and a maximum inclination angle $\theta$ of tray (2) with respect to the horizontal;

c) determining a distance L1 between two consecutive parallel walls and a length L2 of a diagonal of a compartment permitting obtaining a maximum imbalance index; and d) positioning the walls according to lengths L1 and L2.

BRIEF DESCRIPTION OF THE DRAWINGS

Other features and advantages of the method according to the invention will be clear from reading the description hereafter of embodiments given by way of non limitative example, with reference to the accompanying figures wherein.

DETAILED DESCRIPTION OF THE INVENTION

Figure 4:
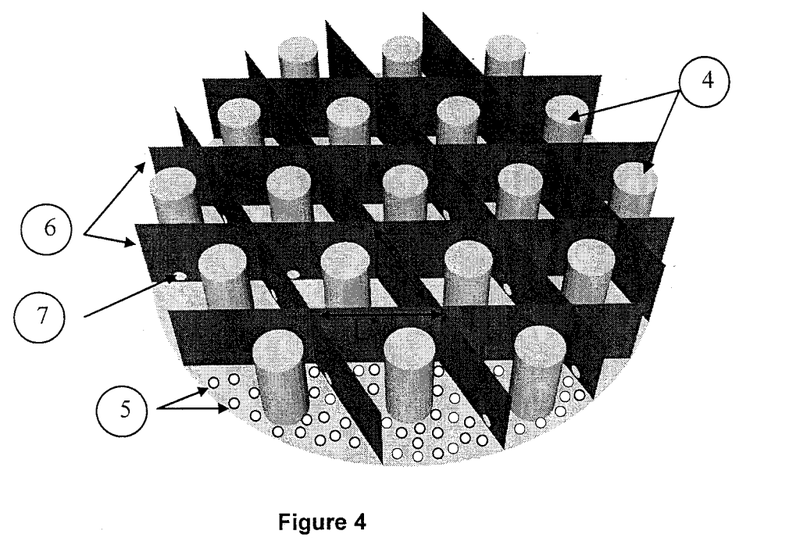
FIG. 4 illustrates a distributor tray according to the invention.

FIG. 4 illustrates a distributor tray according to the invention.

The invention relates to a distributor tray for a column (1) intended for heat and/or material exchange between a gas (G) and a liquid (L), conventionally comprising at least one means (such as a chimney) (4) permitting passage of the gas through the tray, and at least one means (such as an orifice) (5) permitting passage of the liquid through tray (2).

Furthermore, the distributor tray comprises at least one wall (6) permitting a surface of the tray to be partitioned with wall (6) which is perforated (7) to allow part of the liquid to flow between compartments (8) formed by wall (6). According to the invention, each compartment (8) comprises at least one gas passage means (4) and at least one, and preferably multiple liquid passage means (5).

According to an embodiment example used to describe the invention, the distributor tray comprises multiple walls (6).

The walls generate liquid compartments (8) and serve as "barriers" when the tray is inclined. A relatively homogeneous liquid guard level is thus maintained even in case of great inclination. Thus, a good quality of liquid distribution on the gas/liquid contactor is guaranteed. What is referred to as liquid guard is the interface between the gas and the liquid. The height of the liquid guard corresponds to the liquid level with respect to the upper surface of the tray. Furthermore, what is referred to as liquid flow zone is the zone on which the liquid circulates which is the upper side of the tray on which chimneys (4) project. Furthermore, perforations (7) in walls (6) permit the liquid to flow over the entire surface of distributor tray (2), thus providing good radial dispersion of the liquid. Preferably, each compartment (8) comprises a single chimney (4) and orifices (5).

According to an embodiment of the invention, chimneys (4) are cylindrical, which facilitates their manufacture and installation. Furthermore, the pitch of the chimneys on the tray can be triangular or square.

Orifices (5) on tray (2) can have a triangular or square pitch. Advantageously, the number of orifices (5) of tray (2) is larger than the number of chimneys (4). Furthermore, orifices (5) can have identical or different sizes.

Figure 5:
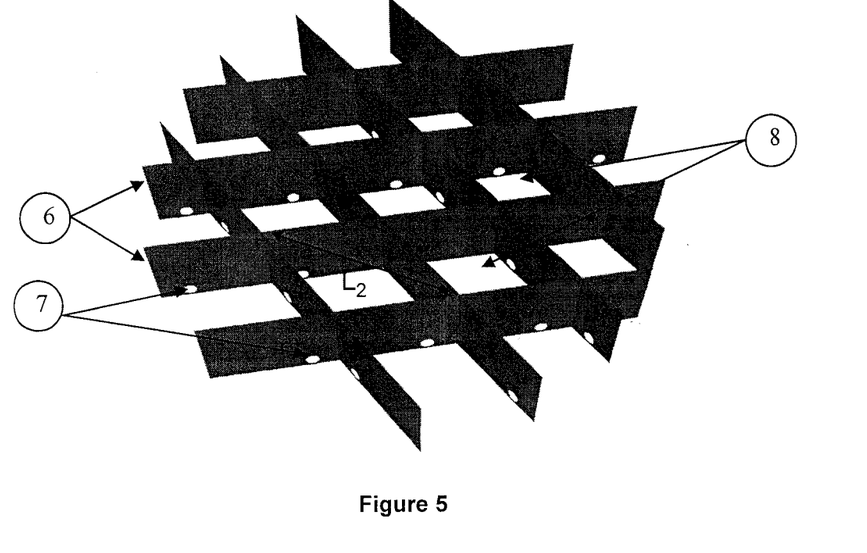
FIG. 5 illustrates the walls of the distributor tray according to the invention.

FIG. 5 illustrates a particular embodiment of walls (6) of the distributor tray according to the invention.

According to this embodiment, the walls are distributed into two series (or sets) of walls. In each series, the walls are parallel to one another, evenly spaced out (by a length L1), and not parallel to the walls of the other series. Thus, the compartments substantially have the shape of a diamond (with the length of the diagonal identified by L2). Advantageously, according to this embodiment, the height of walls (6) is substantially equal to height H of chimneys (4). This height is sufficient to provide good dispersion quality and the space requirement of the distributor tray according to the invention remains identical to that of a "conventional" distributor tray. Each compartment (8) comprises a single chimney (4). According to this embodiment, a spacing L1 substantially equal to the distance between two neighboring chimneys can be selected.

It is also possible to determine length L1 or length L2 as a function of the desired tray characteristics which are an imbalance index IQ (expressed in percentage) and a maximum inclination angle θ imposed by the marine conditions.

Figure 3:
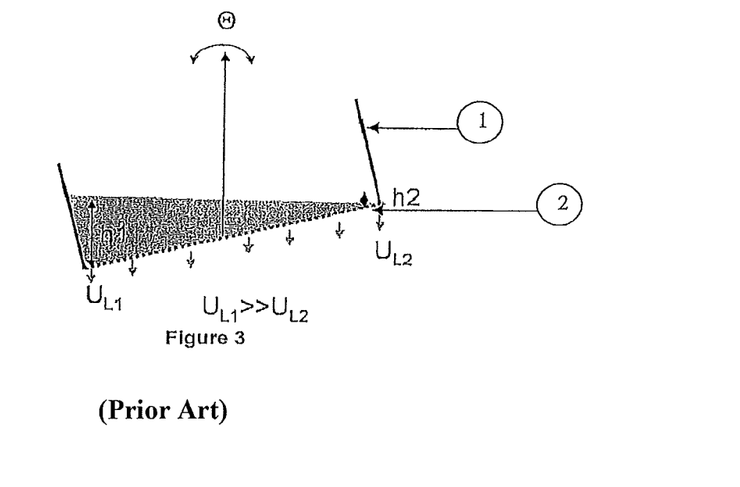
FIG. 3, already described, illustrates an inclined distributor tray according to the prior art.
Figure 9:
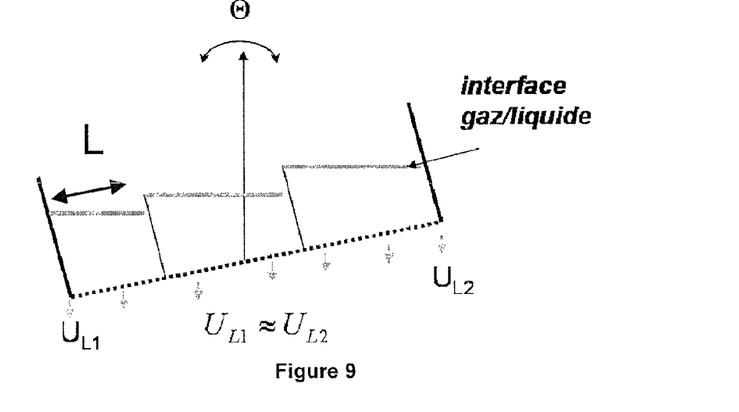
FIG. 9 illustrates the inclined distributor tray according to the invention.

To quantify the sensitivity of the tray to the marine environment, liquid imbalance index IQ is defined as follows:

$$IQ(\%) = \frac{U_{L1} - U_{L2}}{(U_{L1} + U_{L2})/2} 100 \quad \text{(Equation 1)}$$

with: $U_{L1,2}$ being the velocity of the liquid flowing from the orifices arranged at the ends of the distributor tray as shown in FIGS. 3 (prior art) and 9 (according to the invention). A low value of the liquid imbalance index indicates a low sensitivity of the distribution to the effects of the wave motion. On the other hand, a high IQ value indicates a great distribution imbalance.

The characteristic distances L1 and L2 have to be optimized to minimize the imbalance index. Depending on the characteristics of the tray and on the operating conditions (maximum inclination angle θ imposed by the marine environment), it is possible to define an optimum length for L1 and L2 with the combination of the following formulations:

$$\begin{cases} h_{max} = h_o + L_{1,2}\tan\theta \\ h_{min} = h_o - L_{1,2}\tan\theta \\ \Delta h = h_{max} - h_{min} = 2L_{1,2}\tan\theta \\ U_{L1} \propto c_f \sqrt{2gh_{max}} \\ U_{L2} \propto c_f \sqrt{2gh_{min}} \end{cases}$$

with:
$c_f$ being the friction coefficient at the orifice,
$h_o$ being the height at equilibrium (θ=0°) of the liquid guard in a compartment of the distributor,
$h_{max}$ being the maximum height of liquid guard in a compartment of the distributor,
$h_{min}$ being the minimum height of liquid guard in a compartment of the distributor,
$U_{L1}$ and $U_{L2}$ being liquid velocity at the orifice, and
sign ∝ means proportional to.

It is thus possible to determine lengths L1 and L2 as a function of the geometry of the tray and of the marine conditions to meet a given imbalance index. For example, in order to have an imbalance index IQ<10%, it is needed to have Δh≤50 mm. Therefore lengths L1 and L2 must satisfy the relation as follows:

$$L_{1,2} \leq \frac{50}{2\tan\theta} (\text{mm}).$$

According to an embodiment of the invention, each wall (6) contains a single perforation (7). This perforation allows the fluid to flow between the compartments, which provides good radial distribution of the liquid over the entire distributor tray. Perforations (7) can be circular, oblong, rectangular, etc. However, the surface area of perforations (7) can preferably remain small in relation to the surface area of the walls so that walls (6) continue to fulfill their main function which is to limit the amount of fluid flowing on the tray in order to guarantee good homogeneity of the liquid height on the tray. Furthermore, according to this embodiment, in order to prevent linear fluid flow and to provide good radial dispersion of the liquid, the perforations (7) of two parallel walls of a compartment (8) are not aligned (or coaxial). That is, a line passing through the centers of perforation of two parallel walls is not parallel to one of the walls of compartment (8). Advantageously, perforations (7) are arranged in the lower part of walls (6) and close to the distributor tray to facilitate the fluid flow. The perforations (7) always remain positioned below the liquid guard height.

The number of compartments (and therefore of walls) can depend on the diameter of the tray. Preferably, a tray of large size comprises more walls than a tray of smaller size.

In a variant of the preferred embodiment of the invention, the following characteristics can be modified:

The partitioning means can form compartments comprising multiple chimneys respectively.

The compartments can have a triangular shape and for this embodiment, there can be three series of walls with the walls of one series being parallel to one another and inclined to the walls of the other series.

The compartments can have a hexagonal shape (of honeycomb type for example).

The perforations of two sides facing each other in a compartment are aligned.

Each wall comprises multiple perforations.

The liquid passage means (5) are chimneys equipped with at least one perforation (or at least one row of perforations) with the chimneys projecting from one of the surfaces of the tray (2).

The invention also relates to an offshore absorption or regeneration column (1) wherein two fluids are contacted by a gas/liquid contactor (3). The column (1) comprises at least a first inlet for a liquid fluid, at least a second inlet for a gaseous fluid, at least a first outlet for a gaseous fluid and at least a second outlet for a liquid fluid. Column (1) also comprises a distributor tray (2) as described above, allowing distribution of the fluids on the contactor (3).

Advantageously, the gas/liquid contactor (3) is a stacked or random packed bed. Distributor tray (2) can be associated with a dispersion system arranged below the distributor tray which can be a set of sprinklers or of perforated lines arranged in parallel below the distributor tray. The dispersion system provides good dispersion of the liquid in the gas/liquid contactor.

The tray according to the invention is also suited for distillation columns and dehydration columns.

Furthermore, the invention for example relates to a gas treatment and/or $CO_2$ capture unit using gas washing with an absorbent solution containing amines. The unit comprises at least one column (1) as defined above that allows exchanges between the gas and the absorbent solution, and mainly between the gas and the amines that may be contained in the solution.

Finally, the invention relates to an offshore floating barge of FPSO or FLNG type, notably for hydrocarbon production and treatment. The barge comprises a gas treatment and/or $CO_2$ capture unit as described above for cleaning the gases that are produced.

The tray according to the invention is also suited for distillation columns and dehydration columns.

According to an embodiment, the dimensions of the tray and of its components match the following intervals:

Pitch P of chimneys (4) ranges between 100 and 300 mm.

The height of distributor tray (2) ranges between 100 and 2000 mm and preferably is between 600 and 1000 mm.

The diameter of tray (2) ranges between 400 and 5000 mm.

The diameter of chimneys (4) ranges between 50 and 500 mm.

The height of chimneys (4) ranges between 300 and 1000 mm and preferably is between 400 and 700 mm.

The minimum distance to the edge of chimneys (4) ranges between 50 and 200 mm and is preferably 100 mm.

The height of walls (6) ranges between 100 and 2000 mm and preferably is between 700 and 1000 mm.

The diameter of perforations (7) ranges between 5 and 100 mm and preferably is between 30 and 50 mm.

The distances L1 and L2 range between 20 and 2000 mm, and they preferably satisfy the relation as follows:

$$Li \leq \frac{50}{2\tan\theta}(mm)$$

with i=1 or 2.

Furthermore, the invention relates to a method of manufacturing a distributor tray as described above, wherein the following stages are carried out:

a) first selecting a configuration (number and position) of partitions (6) on the tray (2), by selecting for example a set of non-parallel walls according to the embodiment illustrated in FIG. 4, b) defining an imbalance index IQ for the tray (2) wherein:

$$IQ(\%) = \frac{U_{L1} - U_{L2}}{(U_{L1} + U_{L2})/2} 100$$

with $U_{L1}$ and $U_{L2}$ being the velocities of the liquid leaving the tray at two diametrically opposed ends of the tray (FIG. 9);

c) selecting a maximum imbalance index for the tray (2) and a maximum inclination angle θ for tray (2) with respect to the horizontal by fixing these values as a function of the column operating limits (linked with the wave motion for example); and d) determining a distance L1 between two consecutive parallel walls and a length L2 of a diagonal of a compartment allowing the maximum imbalance index to be obtained; and e) positioning the walls in compliance with lengths L1 and L2.

Comparative Example

In order to illustrate the advantages of our invention, a comparison is made of the results obtained with the invention and those obtained with a conventional distributor tray. Therefore a numerical approach of CFD type (Computational Fluid Dynamics) is used which studies the movements of a fluid, or their effects, through the numerical solution of the equations governing the fluid.

The numerical approach used is of Volume-of-Fluid interface tracking type as described in Hirt & Nichols, JCP 39, 201-225 (1981). This method, which is well known, is suitable for simulating the change in interface topology encountered in the distributor subjected to wave motion (detachment, interface reconnection, breaker formation, . . . ). The evolution of the two-phase flow is described by the mass conservation and momentum conservation equations, and by the presence rate transport equation.

Calculations were carried out with the commercial software Fluent 13® (ANSYS, USA).

For all the CFD evaluation calculations presented hereafter, the angle associated with the simulated roll motion is +/−5° with a 15 s period. The properties of the fluids are: $\rho_L$=1055 kg/m3, $\mu_L$=2.5 cp, $\rho_G$=55 kg/m3 and $\mu_G$=0.013 cp. The liquid guard height on the distributor considered is 400 mm. A distance to the gyration point of the offshore platform of 50 m is taken into account in the calculations. This distance corresponds to the distributors arranged at the top of the column, subjected to the highest accelerations. Finally, the capillary effects are assumed to be negligible.

It should be noted that the distribution efficiency of the system of the invention is compared with that of a conventional distributor tray (FIG. 2) in cases where the tray undergoes wave motions. The sensitivity of the tray to the marine environment is quantified by the imbalance index defined by Equation (1).

Example 1

Properties of the "Conventional" Tray (Prior Art of FIG. 2)

The diameter of the distributor tray is 4150 mm.
The diameter of the gas chimneys is 350 mm.

The height of the gas chimneys is 700 mm.

The triangular pitch P of the gas chimneys is 200 mm.

The minimum distance to the edge of the gas chimneys is 100 mm.

The number of chimneys is 19.

The tray porosity (chimney surface area/total surface area) is 13.5.

Example 2

Properties of the Tray According to the Invention
(FIG. 4)

The diameter of distributor tray (2) is 4150 mm.

The diameter of gas chimneys (4) is 350 mm.

The height of gas chimneys (4) is 700 mm.

The triangular pitch P of gas chimneys (4) is 200 mm.

The minimum distance to the edge of chimneys (4) is 100 mm.

The number of chimneys (4) is 19.

The tray porosity (chimney surface area/total surface area) is 13.5.

The height of partitioning means (6) is 700 mm.

The diameter of perforations (7) on partitioning means (6) is 50 mm. The number of compartments (8) is 23 it can be noted that 4 truncated compartments arranged on the periphery of the tray contain no chimney as shown in FIG. 4.

The distance L1 is 920 mm.

The distance L2 is 1600 mm.

Figure 6A:
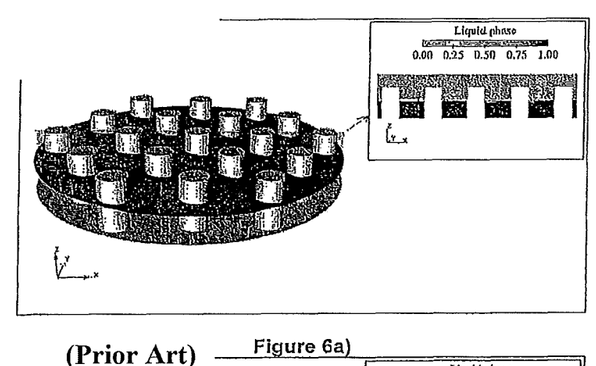
FIGS. 6a) to 6c) illustrate the evolution of the liquid guard level for three angular positions (0°, 5° and −5°) of a tray according to the prior art.
Figure 6B:
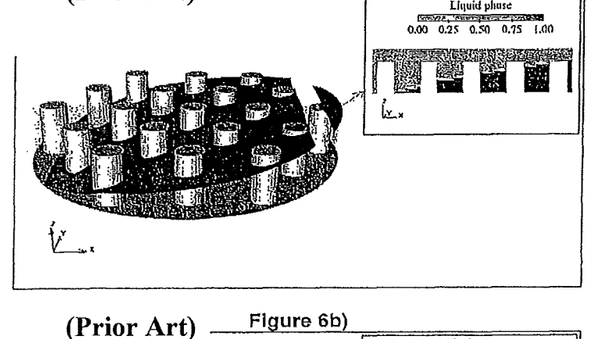
Figure 6C:
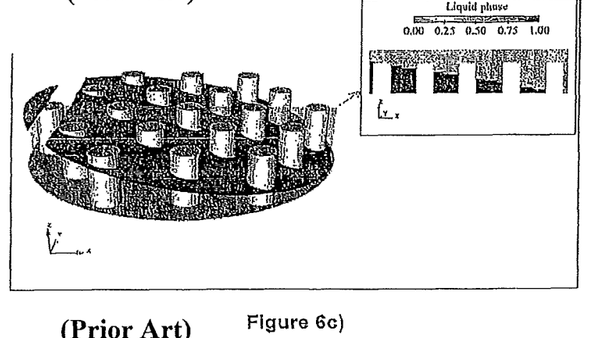
Figure 7A:
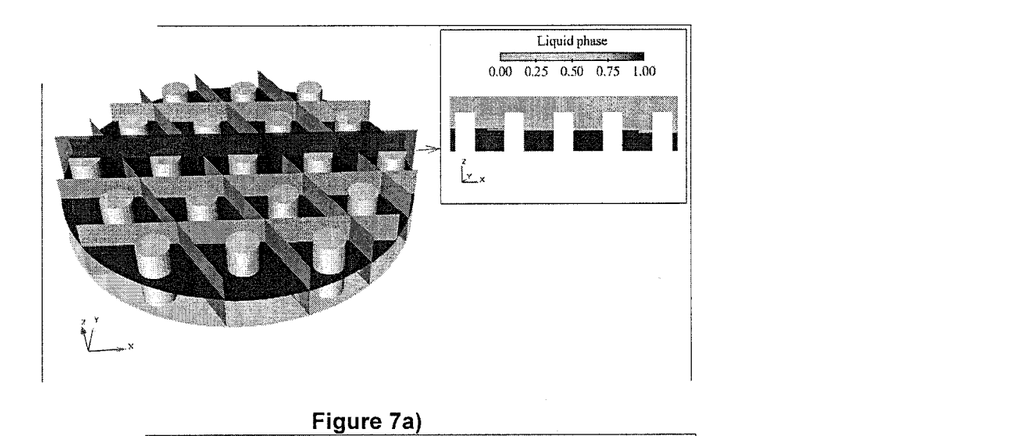
FIGS. 7a) to 7c) illustrate the evolution of the liquid guard level for three angular positions (0°, 5° and −5°) of the tray according to the invention.
Figure 7B:
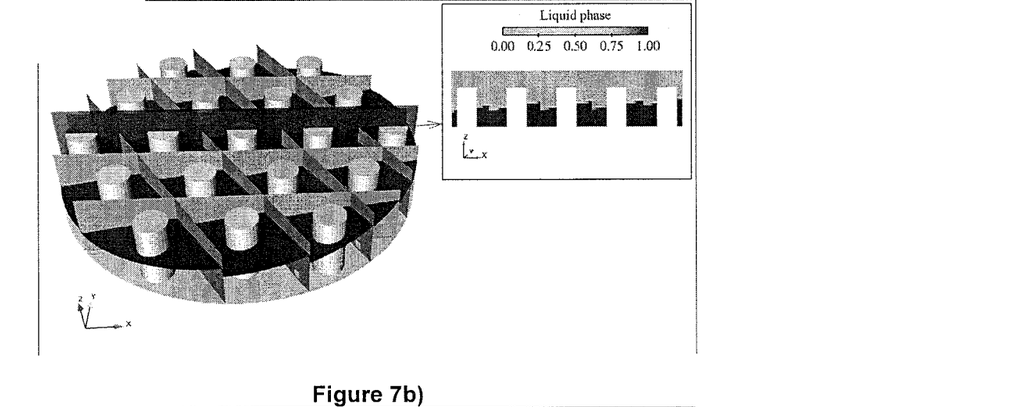
Figure 7C:
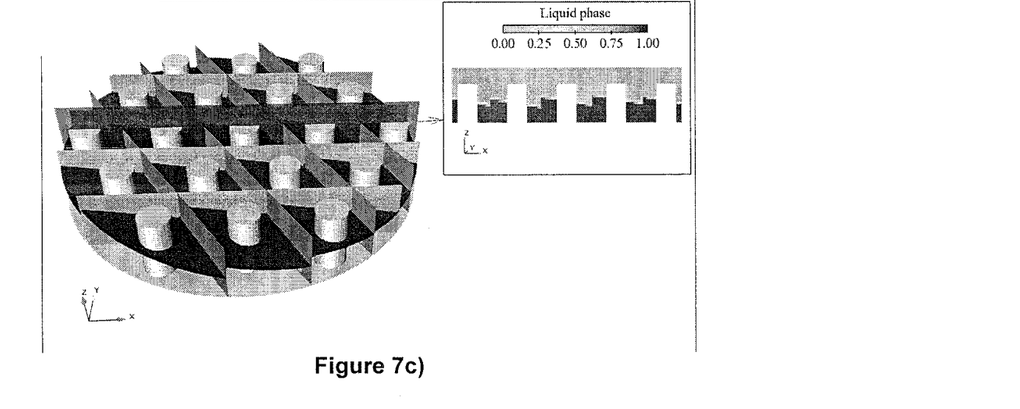

FIGS. 6 and 7 show the evolution of the liquid guard (gas/liquid interface) on the distributor when it is subjected to wave motions, for examples 1 and 2 respectively. The results are obtained from dynamic CFD type calculations. The figures show different instants corresponding to different extreme positions. FIGS. 6a and 7a show the trays in a horizontal position (θ=0°); FIGS. 6b and 7b show the trays in a first extremal position (θ=5°) corresponding to a wave motion; and FIGS. 6c and 7c show the trays in a second extremal position opposite the first extremal position (θ=−5°). The right part of FIGS. 6 and 7 illustrates the variation of the liquid guard height in a vertical plane passing through a diameter of the tray.

The results clearly show that the conventional distributor tray is highly sensitive to the effects of wave motion.

On the other hand, for the device of the invention, the results show that the liquid guard remains quite homogeneous on the distributor tray despite the wave motion, thus providing good distribution quality.

Figure 8:
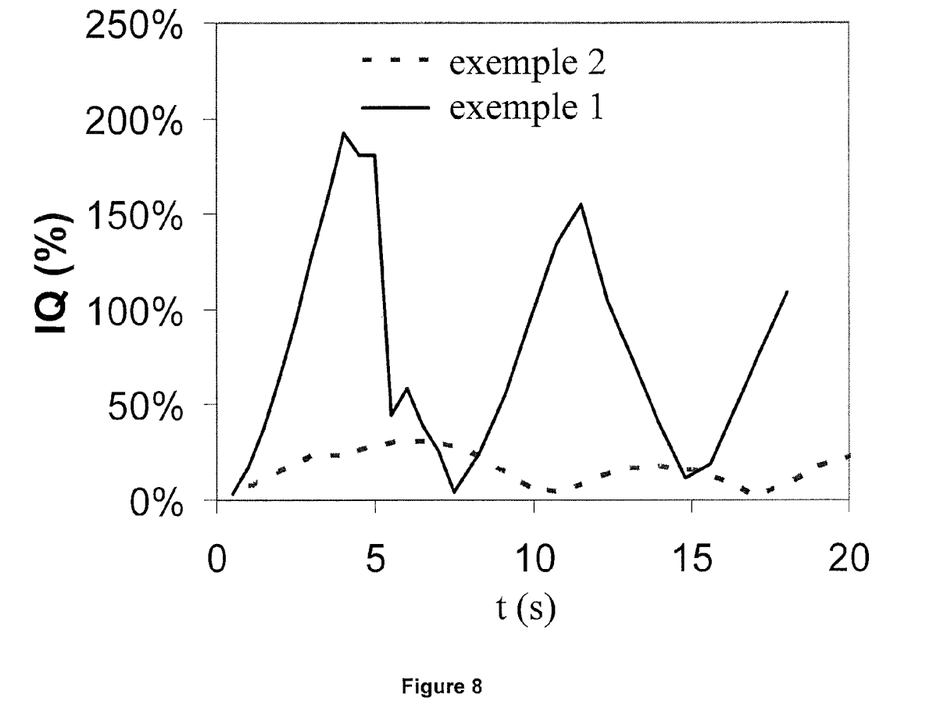
FIG. 8 is a comparative curve between the invention and the prior art.

These results are quantified in FIG. 8 that compares the imbalance index obtained with the two distributor trays. For the conventional tray (example 1), the imbalance index ranges between 0% and 200% over a period of oscillation of the tray with a 200% peak when the angle of inclination reaches its maximum level, i.e. 5°. It can be noted that the value of 200% indicates that part of the distributor tray is no longer in contact with the liquid (see FIGS. 6b and 6c)). Over a period of 15 s, the mean maldistribution rate of the standard distributor is 80%.

On the other hand, the distributor tray according to the invention (example 2) has significantly better performances. Indeed, the imbalance index ranges between 0% and 30% with no part of the tray being drained at any time and the mean maldistribution rate for a period of 15 s is 17%. For a conventional tray to reach results equivalent to those obtained with the invention, a liquid guard height of about 1400 mm is necessary which further increases the size and the weight (weight of the liquid) of the tray consequent from the higher gas chimneys in order to prevent obstruction thereof and significantly increases cost in comparison with the prior art system. This example shows that the invention provides a significant gain in size and distribution efficiency in a floating environment.

The invention claimed is:

1. A distributor tray for a column for providing at least one of heating and material exchange between a gas and a liquid, comprising:
plural walls defining compartments, each compartment for containing the liquid on a surface of the tray, the walls providing a barrier to flow of the liquid between adjacent compartments during inclinations of the tray for maintaining a liquid level on each side of the walls, each wall including in a lower part thereof perforations to permit liquid to flow between the compartments, each compartment comprising at least one means permitting passage of the liquid through the surface of the tray within the compartment and at least one means permitting passage of the gas through the surface of the tray.

2. A tray as claimed in claim 1, wherein the at least one means permitting passage of the gas are chimneys which have a height projecting above a surface of the tray.

3. A tray as claimed in claim 2, wherein a height of the walls is substantially equal to the height of the chimneys.

4. A tray as claimed in claim 1, wherein the perforations are located at a base of the walls.

5. A tray as claimed in claim 2, wherein the perforations are located at a base of the walls.

6. A tray as claimed in claim 3, wherein the perforations are located at a base of the walls.

7. A tray as claimed in any claim 2, wherein the chimneys are cylindrical.

8. A tray as claimed in any claim 3, wherein the chimneys are cylindrical.

9. A tray as claimed in claim 1, wherein the tray comprises non-parallel walls.

10. A tray as claimed in claim 9, wherein the walls comprise two series of walls with the walls of each series being parallel to one another and non-parallel to the walls of the other series.

11. A tray as claimed in claim 10, comprising two parallel walls defining one compartment including perforations which are not aligned.

12. A tray as claimed in claim 9, wherein each wall comprises a single perforation.

13. A tray as claimed in claim 10, wherein a distance L1 between two consecutive parallel walls satisfies the relation as follows:

$$L1 \leq \frac{50}{2\tan\theta} (mm)$$

with θ being a maximum inclination angle of the tray to the horizontal.

14. A tray as claimed in claim 11, wherein a distance L1 between two consecutive parallel walls satisfies the relation as follows:

$$L1 \leq \frac{50}{2\tan\theta} (mm)$$

with θ being a maximum inclination angle of the tray to the horizontal.

15. A tray as claimed in claim 12, wherein a distance L1 between two consecutive parallel walls satisfies the relation as follows:

$$L1 \leq \frac{50}{2\tan\theta} (mm)$$

with θ being a maximum inclination angle of the tray to the horizontal.

16. A tray as claimed in claim 10, wherein a length L2 of a diagonal of a compartment satisfies the relation as follows:

$$L2 \leq \frac{50}{2\tan\theta} (mm)$$

with θ being a maximum inclination angle of the tray to the horizontal.

17. A tray as claimed in claim 11, wherein a length L2 of a diagonal of a compartment satisfies the relation as follows:

$$L2 \leq \frac{50}{2\tan\theta} (mm)$$

with θ being a maximum inclination angle of the tray to the horizontal.

18. A tray as claimed in claim 12, wherein a length L2 of a diagonal of a compartment satisfies the relation as follows:

$$L2 \leq \frac{50}{2\tan\theta} (mm)$$

with θ being a maximum inclination angle of the tray to the horizontal.

19. A tray as claimed in claim 13, wherein a length L2 of a diagonal of a compartment satisfies the relation as follows:

$$L2 \leq \frac{50}{2\tan\theta} (mm)$$

with θ being a maximum inclination angle of the tray to the horizontal.

20. A tray as claimed in claim 19, wherein lengths L1 and L2 range between 20 and 2000 mm.

21. A distributor tray as claimed in claim 1, comprising part of an offshore distributor tray and wherein the means permitting passage of liquid are chimneys equipped with at least one perforation and the chimneys projecting from a surface of the tray.

22. An offshore fluid absorption or regeneration column, wherein two fluids are contacted by a gas/liquid contactor, the column comprising plural walls defining compartments, each compartment for containing the liquid on a surface of a tray, the walls providing a barrier to flow of the liquid between adjacent compartments during inclinations of the tray for maintaining a liquid level on each side of each of the walls, each wall including in a lower part thereof perforations to permit liquid to flow between the compartments, each compartment comprising at least one means permitting passage of the liquid through the surface of the tray within the compartment and at least one means permitting passage of the gas through the surface of the tray.

\* \* \* \* \*